US008341321B2

(12) United States Patent
Siegwart

(10) Patent No.: US 8,341,321 B2
(45) Date of Patent: *Dec. 25, 2012

(54) MANAGING A RESOURCE LOCK

(75) Inventor: David Kevin Siegwart, Hants (GB)

(73) Assignee: International Business Machines Corporation, Armonk, NY (US)

(*) Notice: Subject to any disclaimer, the term of this patent is extended or adjusted under 35 U.S.C. 154(b) by 1025 days.

This patent is subject to a terminal disclaimer.

(21) Appl. No.: 12/098,664

(22) Filed: Apr. 7, 2008

(65) Prior Publication Data

US 2008/0216079 A1   Sep. 4, 2008

Related U.S. Application Data

(63) Continuation of application No. 11/530,055, filed on Sep. 8, 2006.

(51) Int. Cl.
*G06F 12/00* (2006.01)
(52) U.S. Cl. .......................... 710/200; 710/240
(58) Field of Classification Search .............. 710/200, 710/240; 709/229; 718/104
See application file for complete search history.

(56) References Cited

U.S. PATENT DOCUMENTS

| 4,716,528 | A | * | 12/1987 | Crus et al. ............... 710/200 |
| 5,414,839 | A | * | 5/1995 | Joshi ......................... 1/1 |
| 5,737,611 | A | * | 4/1998 | Vicik ........................ 710/200 |
| 6,708,198 | B1 | * | 3/2004 | Simmons et al. ......... 718/104 |
| 6,792,601 | B1 | | 9/2004 | Dimpsey et al. |
| 6,950,945 | B2 | * | 9/2005 | Pfister et al. ............. 718/104 |
| 7,318,220 | B2 | * | 1/2008 | Mehaffy et al. .......... 717/127 |

FOREIGN PATENT DOCUMENTS

EP   1104900 A2   6/2001

OTHER PUBLICATIONS

Anonymous: "Page Info—Mozilla Firefox v.1.5.0.1—General and Links tabs—BEA JRockit 5.0 Documentation" [online] XP002410743 [retrieved Dec. 7, 2006] retrieved from the Internet: <http://e-docs.bea.com/w1jrockit/docs50/intern/pdf.html>, 3 pgs.

(Continued)

*Primary Examiner* — Khanh Dang
(74) *Attorney, Agent, or Firm* — Cuenot, Forsythe & Kim, LLC

(57) ABSTRACT

A method of operating a resource lock for controlling access to a resource by a plurality of resource requesters, the resource lock operating in a contention efficient (heavyweight) operating mode, and the method being responsive to a request from a resource requester to acquire the resource lock, the method comprising the steps of: incrementing a count of a total number of acquisitions of the resource lock in the contention efficient operating mode; in response to a determination that access to the resource is not contended by more than one resource requester, performing the steps of: a) incrementing a count of a number of uncontended acquisitions of the resource lock in the contention efficient operating mode; b) calculating a contention rate as the number of uncontended acquisitions in the contention efficient operating mode divided by the total number of acquisitions in the contention efficient operating mode; and c) in response to a determination that the contention rate meets a threshold contention rate, causing the resource lock to change to a noncontention efficient (lightweight) operating mode.

7 Claims, 3 Drawing Sheets

OTHER PUBLICATIONS

Onodera, T., et al., "A study of locking objects with bimodal fields," SIGPLAN Notices ACM USA, vol. 34, No. 10, Oct. 1999, pp. 223-237.

Andreasson, E., "New features and tools in JRockit 5.0," [online] Feb. 22, 2005, XP002410748 [retrieved Dec. 7, 2006] retrieved from the Internet: <http://dev2dev.bea.com/pub/a/2005/02/jrockit5_new_features.html>, 6 pgs.

Anonymous, "Content of beawjr50docs-pdf.zip—WinZip v9.0" [online] XP002410745 [retrieved Dec. 7, 2006] retrieved from the Internet: <http://e-docs.bea.com/w1jrockit/docs50/zip/beawjr50docts-pdf.zip> 1 pg.

BEA Systems, "Using the BEA JRockit Runtime Analyzer—JRockit 5.0 Service Pack 2," BEA JRockit Runtime Analyzer documentation [online] Jul. 21, 2005, XP002410746, [retrieved Dec. 7, 2006] retrieved from the Internet: <http://e-docs.beas.com/w1jrockit/docs50/zip/beaw1jr50docs-pdf.zip>, 38 pgs.

* cited by examiner

MANAGING A RESOURCE LOCK

CROSS-REFERENCE TO RELATED APPLICATION

This is a Continuation of U.S. application Ser. No. 11/530,055 filed Sep. 8, 2006, the subject matter of which is incorporated herein by reference.

FIELD OF THE INVENTION

The present invention relates to the management of a resource lock. In particular it relates to improving the efficiency of a resource lock operating in one of two operating modes.

BACKGROUND OF THE INVENTION

A software lock is a mechanism to allow one software thread to execute a block of code, while excluding all other threads from simultaneously executing that same block of code. The thread permitted to execute the code is said to 'possess' the lock, and the block of code is known as a synchronised block. Locks are employed to ensure deterministic program behaviour, a characteristic of thread safety, for synchronised blocks which are shared between threads. A compromise for this provision of thread safety is increased overhead in lock processing. Firstly, locking serialises parts of the code which reduces the potential for a program to run efficiently on multiprocessor (MP) machines. For instance, one or more processors may be blocked from entering a block of code (and hence from doing any work) while a thread possessing the lock executes the synchronised block. This is called contention. Secondly, the operation associated with locking has a high overhead, especially when there is no actual contention. In this situation, locking is required due to a possibility of contention, although contention may not actually exist.

Two categories of lock are employed: a "lightweight lock"; and a "heavyweight lock". Lightweight locks avoid high overhead when there is no contention, but perform poorly when there is contention. Lightweight locks are usually implemented using one or more primitive machine instructions and are strongly associated with good hardware support. Heavyweight locks have relatively high overhead when there is no contention, but perform very well when there is contention. Heavyweight locks are often implemented in software, such as through a call to a thread library, kernel, or operating system, and are supported more by algorithms such as queues and schedulers rather than hardware. The heavyweight lock requires significantly greater memory storage, and many more machine operations.

In some software a software lock has a bimodal existence between a lightweight mode and a heavyweight mode. Bimodal existence of locks is explored in detail in the paper "A Study of Locking Objects with Bimodal Fields" (Tamiya Onodera and Kiyokuni Kawachiya, 1999). Initially, the lock is stored as a lightweight lock. When contention occurs, the lock is changed to a heavyweight lock. This change of mode from lightweight to heavyweight is known as lock inflation. The reverse transition, deflation from a heavyweight to a lightweight mode, occurs when certain conditions are satisfied. One of these conditions is that the lock is no longer contended. The process of inflation and deflation allows the best of both worlds: when the lock is inflated it performs well when there is contention; and when it is deflated it performs well when there is no contention.

Typically, deflation will occur as soon as a lock ceases to be contended. This is known as quick-deflation because the deflation occurs at the first opportunity in the absence of further contention. This can be effective where contention is infrequent, but a high frequency of changes between contended and uncontended periods for a lock (intermittent contention) can result in a corresponding high frequency of inflation and deflation of the lock. Intermittency is a chaotic phenomenon whereby periods of one state are punctuated by periods of another state. This may be seen on the small scale, where locks change state frequently between contended and uncontended states, which we call intermittent contention, or on the large scale where long periods of high contention are mixed with long periods of no contention, and also with periods of intermittent contention. A lock that exhibits periods of no contention, high contention, and intermittent contention is referred to as an intermittent lock. Inflation is a relatively expensive process (having a large overhead) and frequent inflation is itself a cause of poor performance in a running software application. Thus intermittent contention causes quick-deflation to be an inefficient algorithm because it causes frequent inflation.

For this reason, software can implement a modification to the quick-deflation policy in which, for each lock, a count is maintained of a number of times that the lock is inflated. When this count exceeds a threshold the lock is prevented from being deflated forever more. This is known as 'sticky' inflation. Thus an intermittent lock will eventually become inflated and stay inflated, but for a non-intermittent lock (i.e. a lock which is either contended or uncontended, but not both) the bimodal behaviour of inflation and deflation ensures that the lock is in an appropriate mode. Sticky inflation resolves the problem of high frequency inflation due to intermittent contention, however an intermittent lock is not fully optimised once sticky inflation has taken place because there is no opportunity to deflate the lock in the event that the lock ceases to demonstrate intermittent contention. Intermittent locks can experience highly chaotic behaviour: sometimes uncontended; sometimes contended; and sometimes intermittent. During intermittent periods it will be best for the lock to be either inflated or deflated depending on the degree of contention. During the uncontended periods, it will be best for the lock to be deflated. During the contended periods it will be best for the lock to be inflated. However the sticky inflation policy does not take into account these situations.

An improvement to sticky inflation is available which resets the inflation count to zero after a certain period. Whilst this can remove the drawback of sticky inflation after the certain period, a definition of the appropriate period is difficult to arrive at. For example a count can be reset after each execution of a Garbage Collector routine for the disposal of unused software entities, such as objects. However, there is no formal relationship between the behaviour of a lock and occurrences of garbage collection. Furthermore there is no good criterion for deciding when a lock's inflation count should be reset. Sticky inflation with such an improvement also necessitates two parameters: a parameter to determine when inflation should be sticky; and a threshold parameter to determine when deflation should occur.

This it would be advantageous to provide a scheme for the inflation and deflation of locks which provides for intermittent locks remaining bimodal, allowing them to be inflated when contended and deflated when uncontended, and further allowing for locks to remain either inflated or deflated depending on a degree of contention when the contention is intermittent.

SUMMARY OF THE INVENTION

The present invention accordingly provides, in a first aspect, a method of operating a resource lock for controlling access to a resource by a plurality of resource requesters, the resource lock operating in a contention efficient (heavyweight) operating mode, and the method being responsive to a request from a resource requester to acquire the resource lock, the method comprising the steps of: incrementing a count of a total number of acquisitions of the resource lock in the contention efficient operating mode; in response to a determination that access to the resource is not contended by more than one resource requester, performing the steps of: a) incrementing a count of a number of uncontended acquisitions of the resource lock in the contention efficient operating mode; b) calculating a contention rate as the number of uncontended acquisitions in the contention efficient operating mode divided by the total number of acquisitions in the contention efficient operating mode; and c) in response to a determination that the contention rate meets a threshold contention rate, causing the resource lock to change to a non-contention efficient (lightweight) operating mode.

In this way the performance of the resource lock is improved. Where the resource lock is uncontended it remains in the non-contention efficient mode. Where the resource lock is contended it remains in the contention efficient mode. Where the resource lock is intermittent (i.e. the resource lock is sometimes contended and sometimes uncontended) it will be changed to the non-contention efficient operating mode only where the contention rate does not meet the threshold contention rate. Otherwise, the resource lock will remain in the contention efficient operating mode. The resource lock remains in the contention efficient operating mode for high rates of contention without the needless cost of continually entering and leaving the contention efficient operating mode. The resource lock is changed to the non-contention efficient operating mode when required for low rates of contention. Where the resource lock is intermittent, the frequent cycle of changing between operating modes caused by sudden changes in contention is avoided, and instead this cycle is dampened by the slower changing nature of the contention rate. Thus a scheme is provided for the inflation and deflation of locks which allows intermittent locks to remain bimodal, allowing them to be inflated when contended and deflated when uncontended, and allows for locks to be either inflated or deflated depending on a degree of contention when the lock is intermittent. The degree of contention is the contention rate as compared to the threshold contention rate.

Preferably, the determination that access to the resource lock is not contended by more than one resource requester includes a determination that the resource requester obtains a fast acquisition of the resource lock.

Preferably, causing the resource tock to change to a non-contention efficient (lightweight) operating mode includes storing the count of the number of uncontended acquisitions in the contention efficient operating mode and the count of the total number of acquisitions in the contention efficient operating mode for use in a subsequent contention efficient (heavyweight) operating mode.

The present invention accordingly provides, in a second aspect, a system for operating a resource lock to controlling access to a resource by a plurality of resource requesters, the resource lock operating in a contention efficient (heavyweight) operating mode, and the system being responsive to a request from a resource requester to acquire the resource lock, the system comprising: means for incrementing a count of a total number of acquisitions of the resource lock in the contention efficient operating mode; means for, in response to a determination that access to the resource is not contended by more than one resource requester a) incrementing a count of a number of uncontended acquisitions of the resource lock in the contention efficient operating mode; b) calculating a contention rate as the number of uncontended acquisitions in the contention efficient operating mode divided by the total number of acquisitions in the contention efficient operating mode; and c) in response to a determination that the contention rate meets a threshold contention rate, causing the resource lock to change to a non-contention efficient (lightweight) operating mode.

The present invention accordingly provides, in a third aspect, an apparatus comprising: a central processing unit; a memory subsystem; an input/output subsystem; and a bus subsystem interconnecting the central processing unit, the memory subsystem, the input/output subsystem; and the system as described above.

The present invention accordingly provides, in a fourth aspect, a computer program element comprising computer program code to, when loaded into a computer system and executed thereon, cause the computer to perform the steps of a method as described above.

BRIEF DESCRIPTION OF THE DRAWINGS

A preferred embodiment of the present invention will now be described, by way of example only, with reference to the accompanying drawings, in which.

DETAILED DESCRIPTION OF THE PREFERRED EMBODIMENT

Figure 1:
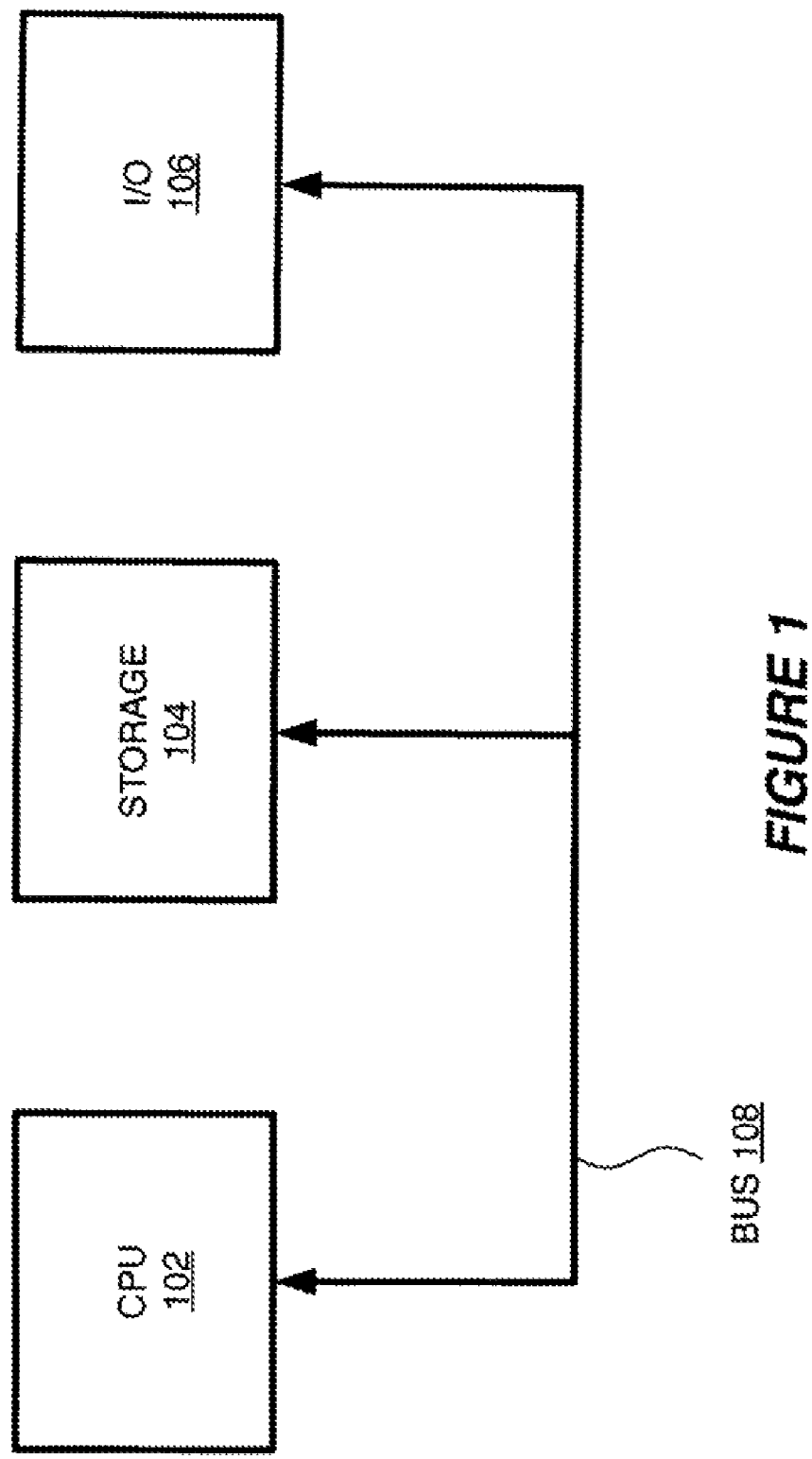
FIG. 1 is a block diagram of a computer system suitable for the operation of embodiments of the present invention.

FIG. 1 is a block diagram of a computer system suitable for the operation of embodiments of the present invention. A central processor unit (CPU) 102 is communicatively connected to a storage 104 and an input/output (I/O) interface 106 via a data bus 108. The storage 104 can be any read/write storage device such as a random access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Figure 2:
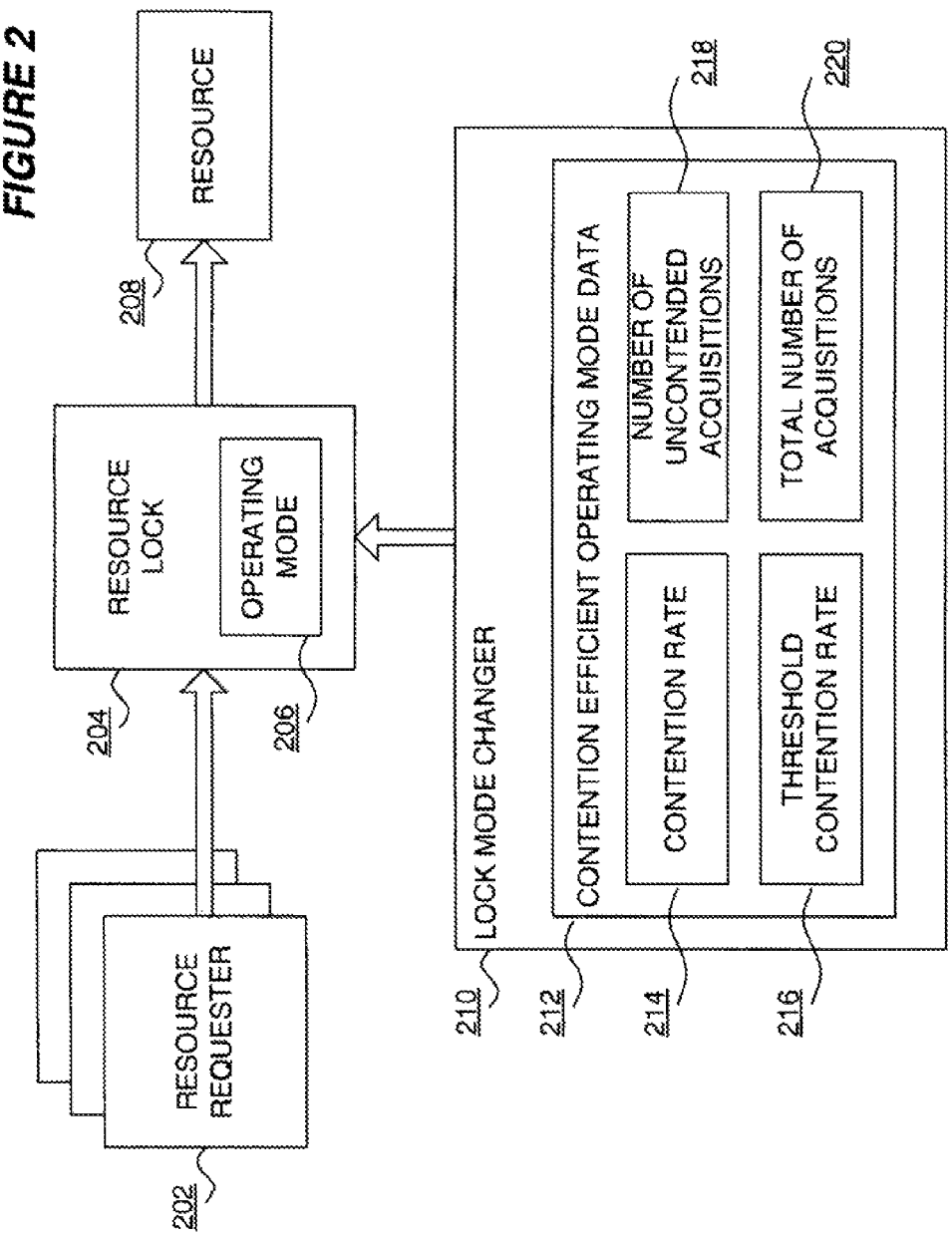
FIG. 2 is a block diagram of a resource lock for a resource including a lock mode changer in accordance with a preferred embodiment of the present invention.

FIG. 2 is a block diagram of a resource lock 204 for a resource 208 including a lock mode changer 210 in accordance with a preferred embodiment of the present invention. The resource lock 204 is a software or hardware component for controlling access to the resource 208 by a plurality of resource requesters 202. The resource 208 can be any shared resource, such as an executable software routine including program code. Each of the resource requesters 202 is an entity which requests access to the resource by way of acquiring the resource lock 204. For example, a resource requester 202 can be a software thread. The resource lock 204 provides access for a resource requester 202 which has acquired the resource lock 204 to the resource 208. When acquired by a resource requester 202, other resource requesters can access the resource 208 only by requesting, and subsequently acquiring, the resource lock 2041

The resource lock 204 operates in two operating modes: a contention efficient operating mode, such as a heavyweight operating mode; and a non-contention efficient operating mode, such as a lightweight operating mode. The significance of these operating modes is described in detail above. A particular mode of operation of the resource lock 204 is recorded associated with the lock as operating mode 206. In use, the resource lock 204 is able to change from the non-contention efficient operating mode to the contention efficient operating mode through a process such as inflation as is well known in the art. Similarly, the resource lock 204 is able to change from the contention efficient operating mode to the non-contention efficient operating mode through a process such as deflation, as is also well known in the art. A lock mode changer 210 is operable to affect a change in the operating mode 206 of the resource lock 204. The lock mode changer 210 is a software or hardware component illustrated schematically as being in communication with the resource lock 204. Alternatively, the lock mode changer 210 can be provided as a function of the resource lock 204, or as a function of a runtime environment or operating system. The lock mode changer 210 includes contention efficient operating mode data 212 which includes information relating to the resource lock 204 when the resource lock 204 operates in the contention efficient operating mode. Contention efficient operating mode data 212 includes: a number of uncontended acquisitions 218 in the contention efficient operating mode; a total number of acquisitions 220 in the contention efficient operating mode; a contention rate 214 in the contention efficient operating mode; and a threshold contention rate 216. These are considered in more detail below.

The number of uncontended acquisitions 218 in the contention efficient operating mode is a count of a number of acquisitions of the resource lock 204 by any of the resource requesters 202 in the contention efficient operating mode where the acquisition was not contended by any other of the resource requesters 202. A method for maintaining a value of the number of uncontended acquisitions 218 is included in the description relating to FIG. 3 below, and includes incrementing the number of uncontended acquisitions 218 whenever an acquisition of the resource lock 204 is not contended by any other of the resource requesters 202 in the contention efficient operating mode (recursive entries to the lock by the owner of the lock can be excluded from counting).

The total number of acquisitions 220 in the contention efficient operating mode is a count of a total number of acquisitions made by any of the resource requesters in the contention efficient operating mode. A method for maintaining a value of the total number of acquisitions 220 is included in the description relating to FIG. 3 below and includes incrementing the total number of acquisitions 220 whenever the resource lock 204 is acquired in the contention efficient operating mode.

The contention rate 214 is a measure of the approximate rate of contention of the resource lock 204 in the contention efficient operating mode. The contention rate 214 can be calculated by dividing the total number of acquisitions 220 by the number of uncontended acquisitions 218.

The threshold contention rate 216 is a predefined value of a contention rate selected such that when a value of the contention rate 214 in the contention efficient operating mode meets the value of the threshold contention rate 216, the operating mode 206 of the resource lock 204 is changed to the non-contention efficient operating mode.

In this way the performance of the resource lock 204 is improved. Where the resource lock 204 is uncontended (i.e. the contention rate 214 meets the threshold contention rate 216), the resource lock 204 remains in the non-contention efficient mode. Where the resource lock 204 is contended (i.e. The contention rate 214 does not meet the threshold contention rate 216), the resource lock 204 remains in the contention efficient mode. Where the resource lock 204 is intermittent (i.e. the resource lock is sometimes contended and sometimes uncontended) the resource lock 204 will be changed to the non-contention efficient operating mode only where the contention rate 214 does not meet the threshold contention rate 216. Otherwise, the resource lock 204 will remain in the contention efficient operating mode. This is effective because, for high rates of contention, it is better to have the resource lock 204 in the contention efficient operating mode (without the needless cost of continually entering and leaving the contention efficient operating mode, i.e. inflation overhead), and for low rates of contention, it is better to accept the cost of changing to the contention efficient operating mode (inflation) when occasionally required for the benefit of using the non-contention efficient (lightweight) operating mode most of the time. Also, where the resource lock 204 is intermittent, the frequent cycle of changing between operating modes caused by sudden changes in contention is avoided, and instead this cycle is dampened by the slower changing nature of the contention rate 214.

It will be appreciated by those skilled in the art that the process of a resource requester 202 acquiring the resource lock 204 can be implemented using an approach to resource lock acquisition known as 'spinlocks'. Using this approach, when the resource lock 204 is contended in the contention efficient operating mode, a resource requester 202 attempting to acquire the resource lock 204 performs two or more repeated attempts to acquire the lock before determining that the resource lock 204 is indeed contended. For example, in the scenario where the resource requester 202 is a software thread, the thread attempts to acquire the resource lock 204 a first time before identifying that the resource is in use. Subsequently the thread will wait for a short time (known as a "busy wait") before attempting a subsequent acquisition of the resource lock 204. This may be repeated several times before the thread concludes that the resource lock 204 is indeed contended and the thread will block. If a resource requester 202 acquires the resource lock 204 before concluding that the resource is contended, the acquisition is known as a "fast" acquisition. Alternatively, if the resource requester 202 acquires the resource lock 204 only after blocking the acquisition is known as a "slow" acquisition. A "fast" acquisition is considered to be an acquisition which is not contended for the purpose of maintaining the number of uncontended acquisitions 218. A "slow" acquisition is considered to be an acquisition which is contended for the purpose of maintaining the number of uncontended acquisitions 218.

Figure 3:
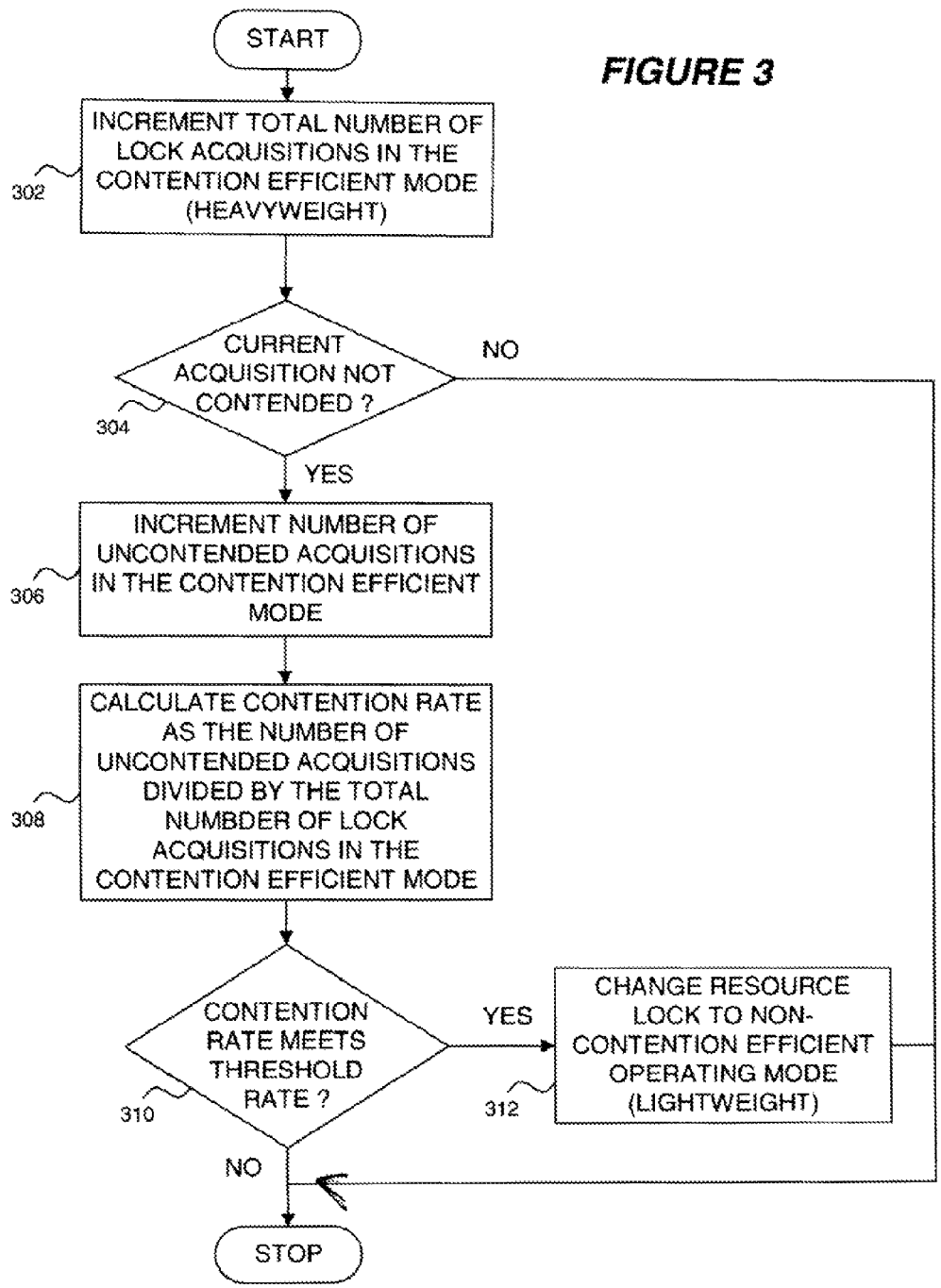
FIG. 3 is a flowchart of a method of the lock mode changer of FIG. 2 for the resource lock of FIG. 2 operating in a contention efficient operating mode in accordance with a preferred embodiment of the present invention.

FIG. 3 is a flowchart of a method of the lock mode changer 210 of FIG. 2 for the resource lock 204 of FIG. 2 operating in a contention efficient operating mode in accordance with a preferred embodiment of the present invention. The method of FIG. 3 is responsive to a request from a resource requester 202 to acquire the resource lock 204. At step 302 the total number of lock acquisitions 218 in the contention efficient operating mode is incremented. At step 304, the method determines if the present acquisition of the resource lock 204 is not contended by more than one resource requester 202. For example, the present acquisition of the resource lock 204 is not contended if it is a "fast" acquisition in a spinlock approach to lock acquisition. If the present acquisition of the resource lock 204 is contended by more than one resource requester 202 (such as a "slow" acquisition) the method terminates. If step 304 determines that the present acquisition is not contended by more than one resource requester 202 (such as a "fast" acquisition), the method proceeds to step 306 where the number of uncontended acquisitions 218 in the contention efficient mode is incremented. Subsequently, at step 308, the method calculates the contention rate 214 as the total number of acquisitions 220 in the contention efficient mode divided by the number of uncontended acquisitions 208 in the contention efficient mode. At step 310 the method determines if the contention rate 214 meets the threshold rate 216, such as by exceeding the threshold rate 216. Only if the contention rate 214 does meet the threshold rate 216 the lock mode changer 210 changes the operating mode 206 of the resource lock 204 to the non-contention efficient operating mode. Alternatively, the deflation can occur once the lock is exited; at that point a determination can be made as to whether the lock can be deflated (if it is actually contended or there are other resource requesters in a "wait" state). If the lock can be deflated, it is.

The calculation of the contention rate 214 and comparison of the contention rate 214 against the threshold contention rate 216 is undertaken only when in the resource lock 204 is in the contention efficient operating mode. It is not undertaken in the non-contention efficient operating mode because the resource overhead of undertaking these calculations and comparisons in the non-contention efficient operating mode are too great and constitute an unacceptable performance burden.

In an alternative embodiment of the present invention, the number of uncontended acquisitions 218 in the contention efficient operating mode and the total number of acquisitions 220 in the contention efficient operating mode are stored to a data store when the lock mode changer 210 changes the operating mode 206 of the resource lock 204 from the contention efficient operating mode to the non-contention efficient operating mode. The data store can form part of the lock itself, such as a 'lockword' constituting a lightweight lock. In this way these values persist for the resource lock 204 between changes in the operating mode 206.

The invention claimed is:

1. A system for operating a resource lock for controlling access to a resource by a plurality of resource requesters, the resource lock operating in a contention efficient (heavyweight) operating mode, and the system being responsive to a request from a resource requester to acquire the resource lock, the system comprising:
  means for incrementing a count of a total number of acquisitions of the resource lock in the contention efficient operating mode;
  means for, in response to a determination that access to the resource is not contended by more than one resource requester
    a) incrementing a count of a number of uncontended acquisitions of the resource lock in the contention efficient operating mode;
    b) calculating a contention rate as the number of uncontended acquisitions in the contention efficient operating mode divided by the total number of acquisitions in the contention efficient operating mode; and
    c) in response to a determination that the contention rate meets a threshold contention rate, causing the resource lock to change to a non-contention efficient (lightweight) operating mode.

2. The system of claim 1 wherein the determination that access to the resource lock is not contended by more than one resource requester includes a determination that the resource requester obtains a fast acquisition of the resource lock.

3. The system of claim 1 wherein the means for causing the resource lock to change to a non-contention efficient (lightweight) operating mode includes means for storing the count of the number of uncontended acquisitions in the contention efficient operating mode and the count of the total number of acquisitions in the contention efficient operating mode for use in a subsequent contention efficient (heavyweight) operating mode.

4. An apparatus comprising:
  a central processing unit;
  a memory subsystem;
  an input/output subsystem; and
  a bus subsystem interconnecting the central processing unit, the memory subsystem, the input/output subsystem; and
  the system as claimed in claim 1.

5. A computer program element comprising a computer usable storage medium having stored therein computer usable program code for operating a resource lock for controlling access to a resource by a plurality of resource requesters, the resource lock operating in a contention efficient (heavyweight) operating mode and responsive to a request from a resource requester to acquire the resource lock, the computer usable program code, which when loaded into a computer hardware system and executed thereon, causes the computer hardware system to perform:
  incrementing a count of a total number of acquisitions of the resource lock in the contention efficient operating mode;
  in response to a determination that access to the resource is not contended by more than one resource requester:
    a) incrementing a count of a number of uncontended acquisitions of the resource lock in the contention efficient operating mode;
    b) calculating a contention rate as the number of uncontended acquisitions in the contention efficient operating mode divided by the total number of acquisitions in the contention efficient operating mode; and
    c) in response to a determination that the contention rate meets a threshold contention rate, causing the resource lock to change to a non-contention efficient (lightweight) operating mode.

6. The computer program element of claim 5, wherein the determination that access to the resource lock is not contended by more than one resource requester includes a determination that the resource requester obtains a fast acquisition of the resource lock.

7. The computer program element of claim 5 wherein the resource lock is caused to change to the non-contention efficient (lightweight) operating mode by storing the count of the number of uncontended acquisitions in the contention efficient operating mode and the count of the total number of acquisitions of the resource lock in the contention efficient operating mode.

* * * * *